(12) United States Patent
Larsen

(10) Patent No.: US 7,481,155 B2
(45) Date of Patent: Jan. 27, 2009

(54) JUICE EXTRACTOR

(75) Inventor: Atle Larsen, Richmond, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 0 days.

(21) Appl. No.: 11/681,527

(22) Filed: Mar. 2, 2007

(65) Prior Publication Data

US 2007/0210193 A1 Sep. 13, 2007

Related U.S. Application Data

(60) Provisional application No. 60/780,583, filed on Mar. 9, 2006.

(51) Int. Cl.
*A23N 1/00* (2006.01)

(52) U.S. Cl. .............................. 99/511; 99/492; 99/513; 241/37.5; 241/92

(58) Field of Classification Search ........... 99/485–587, 99/509–513, 492, 468, 495, 348; 241/37.5, 241/92, 282.2, 282.1; 366/314, 601
See application file for complete search history.

(56) References Cited

U.S. PATENT DOCUMENTS

| | | | |
|---|---|---|---|
| 528,735 A | 11/1894 | Naylor, Jr. | |
| 2,496,780 A | 2/1950 | Nardis et al. | |
| 2,840,130 A | 6/1958 | Schwarz | |
| 2,971,550 A | 2/1961 | Henzirohs | |
| 3,209,456 A | 10/1965 | Lozach | |
| 4,397,427 A | 8/1983 | Howard | |
| D287,327 S | 12/1986 | Cavalli | |
| D309,083 S | 7/1990 | Kahlcke | |
| D318,402 S | 7/1991 | Barrault | |
| D333,412 S | 2/1993 | Levin | |
| 5,193,448 A * | 3/1993 | Antonio | 99/512 |
| D343,097 S | 1/1994 | Cesari et al. | |
| 5,479,851 A * | 1/1996 | McClean et al. | 99/512 |
| 5,613,430 A | 3/1997 | Lee | |
| RE35,789 E | 5/1998 | Amstad | |
| D413,227 S | 8/1999 | Alonge et al. | |
| 6,397,736 B1 | 6/2002 | Tseng et al. | |
| D469,302 S | 1/2003 | Li | |
| D475,582 S | 6/2003 | To | |
| D489,949 S | 5/2004 | Chung | |
| 6,813,997 B1 * | 11/2004 | Lin | 99/511 |
| 7,059,241 B2 | 6/2006 | Lin | |
| 2006/0075907 A1 * | 4/2006 | Hsu | 99/511 |
| 2006/0260478 A1 * | 11/2006 | Hsu | 99/495 |

* cited by examiner

*Primary Examiner*—Timothy F. Simone
(74) *Attorney, Agent, or Firm*—Panitch Schwarze Belisario & Nadel LLP

(57) ABSTRACT

A fruit and vegetable juice extractor for extracting juice includes a grating disc rotatable about a substantially vertical axis. A frustoconically shaped filter is attached to the outer periphery of the grating disc and projects upwardly and outwardly thereof. A food chute is arranged above the grating disc and the filter. The food chute includes a rib extending at least partially in the axial direction and projecting radially inwardly. A food pusher is insertable into the food chute.

11 Claims, 6 Drawing Sheets

JUICE EXTRACTOR

CROSS-REFERENCE TO RELATED APPLICATIONS

This application claims the benefit of U.S. Provisional Patent Application No. 60/780,583 filed Mar. 9, 2006 entitled "Juice Extractor" which is incorporated by reference herein in its entirety.

BACKGROUND OF THE INVENTION

This invention generally relates to juice extractors and, more particularly, to a juice extractor having a relatively large food chute to facilitate the passage of larger food stuffs therethrough.

Juice extractors are generally known in the small appliance art. Typically, juice extractors have relatively small food chutes through which smaller diameter food stuffs like carrots, celery, and the like can be passed to extract juice therefrom, typically one-by-one. When using such a juice extractor, if a user wishes to extract juice from a larger food stuff, like an apple, for instance, the user must first chop the larger food stuff into smaller pieces sized to fit through the smaller chute. This process can be particularly cumbersome and time-consuming when the user wishes to produce a larger amount of juice.

To address this problem, juice extractors were produced with larger food chutes to enable more than one smaller food item or at least one larger food item to be passed through the food chute at a time. However, an inherent problem with such larger food chutes is that smaller food stuffs have the tendency to rotate around the food chute, often times violently, if unrestrained. For this reason, certain such juice extractors include knife edges or hinged members within the food chutes to restrain rotational motion of such food stuffs within the food chute.

Such rotation-inhibiting structures are not without drawbacks, however. For instance, knife edges are more prone to breakage, and, because the knife edges physically cut into the food stuffs as the food stuffs are passed through the food chute, knife edges tend to make it relatively difficult to pass harder food stuffs through the larger food chute. Employing a hinged member within the food chute requires the use of a relatively large cutter/strainer assembly therein in order to accommodate displacement of the hinged member when larger food stuffs are passed through the food chute. When compared to a smaller cutter/strainer assembly, because of the larger diameter of the larger cutter/strainer assembly, greater linear speeds are experienced at an outer edge of the larger cutter/strainer assembly and larger forces are imparted on the larger cutter/strainer assembly during rotation thereof, assuming both the larger and smaller cutter/strainer assemblies are rotated at the same angular speed. For this reason, balancing of the larger cutter/strainer assembly is more critical than with smaller cutter/strainer assemblies to avoid wobble of the larger cutter/strainer assembly during usage. An additional drawback to the use of a hinged member is the relatively high cost of the juice extractor, not only for the manufacture and implementation of the hinged member, but also for the extra material costs of the larger cutter/strainer assembly and the housing to accommodate the larger cutter/strainer assembly. Also, the larger cutter/strainer assembly must be made relatively stronger than smaller cutter/strainer assemblies in order to withstand the larger forces experienced thereby, further adding to the cost thereof.

For this reason, it would be desirable to provide a relatively inexpensive juice extractor having a relatively large food chute that can accommodate larger amounts and sizes of food stuffs, which is able to inhibit rotation of the food stuffs within the food chute, while at the same time being relatively easy to clean and assemble. It is desirable that the juice extractor have an anti-rotation structure within the food chute that is less prone to breakage and that is relatively easy to pass food stuffs by, even if the food stuffs are relatively hard. It is further desirable that the juice extractor have a device for securing the lid yet allows for convenient lid removal.

BRIEF SUMMARY OF THE INVENTION

Briefly stated, the present invention is directed to a fruit and vegetable juice extractor. The fruit and vegetable juice extractor comprises a grating disc rotatable about a substantially vertical axis. A frustoconically shaped filter is attached to the outer periphery of the grating disc and projects upwardly and outwardly thereof. A food chute is arranged above the grating disc and the filter. The food chute includes a rib extending at least partially in the axial direction and projecting radially inwardly. A food pusher is insertable into the food chute.

In another aspect, the invention is directed to a fruit and vegetable juice extractor. The fruit and vegetable juice extractor comprises a motor housing and an upper housing mounted to the top of the motor housing. The upper housing has a generally hollow interior and an open top. The upper housing includes a spout extending generally downwardly and fluidly communicating with the hollow interior. A pulp container is located proximate to the motor housing and has an open top. A lid covers the open top of the pulp container and substantially covers the open top of the upper housing. A food chute extends through the lid for allowing access to the interior of the upper housing. At least one pivot arm is pivotably attached to the motor housing. The pivot arm has an axis of rotation generally tangent to the outer periphery of the upper housing. The distal end of the pivot arm is in removable engagement with the lid such that the lid is held onto the upper housing when the pivot arm is engaged with the lid.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Figure 1:
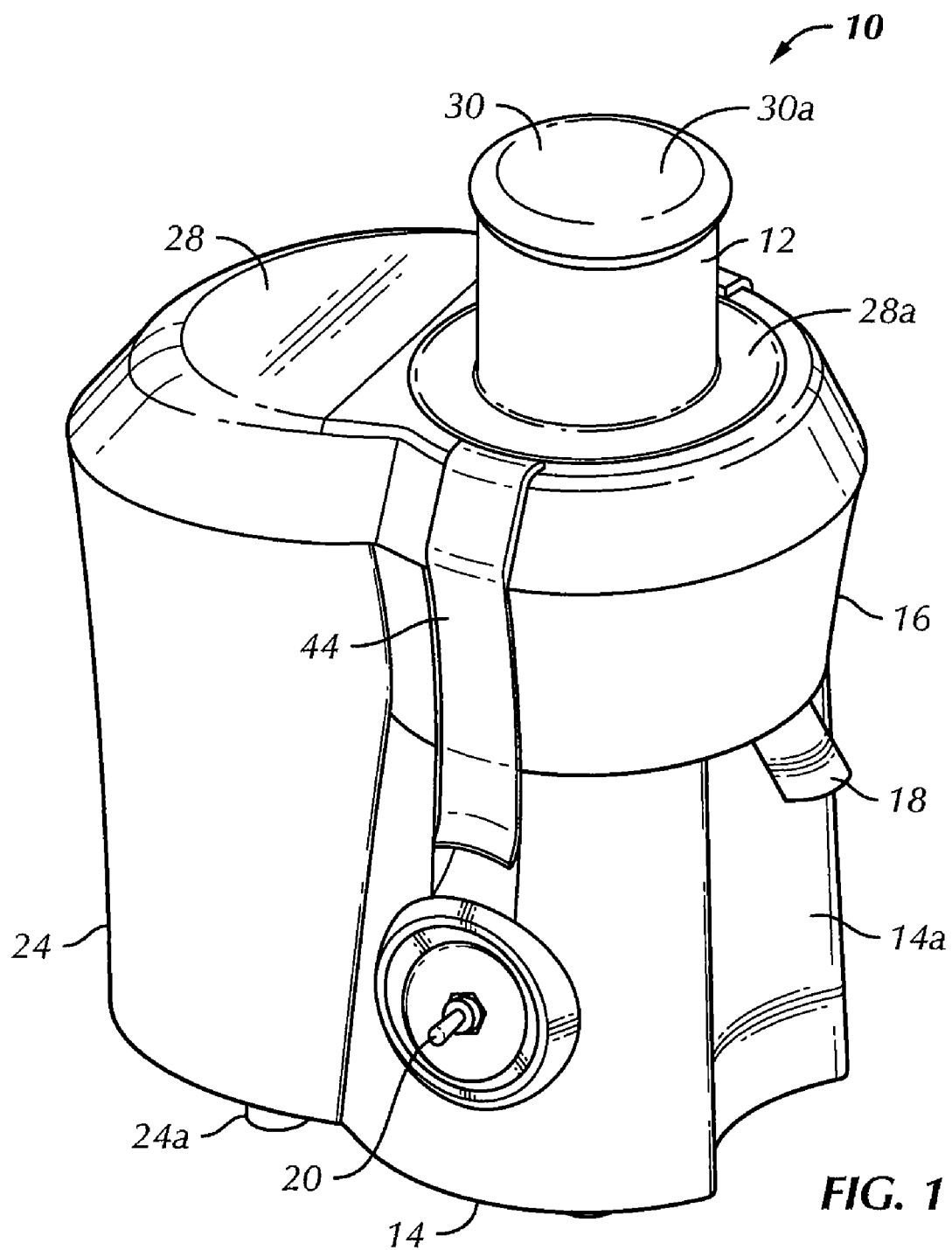
FIG. 1 is a front left side perspective view of a juice extractor in accordance with the preferred embodiment of the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of a juice extractor in accordance with the present invention, and designated parts thereof. The terminology includes the words noted above, derivatives thereof and words of similar import.

Referring to the drawings in detail, wherein like numerals indicate like elements throughout, there is shown in FIGS. 1-6 a preferred embodiment of a juice extractor, indicated generally at 10, in accordance with the present invention. The juice extractor 10 of the present invention preferably includes a relatively large food chute 12 to allow the passage of multiple and/or larger food stuffs (not shown) there through, as described in greater detail below.

Figure 2:
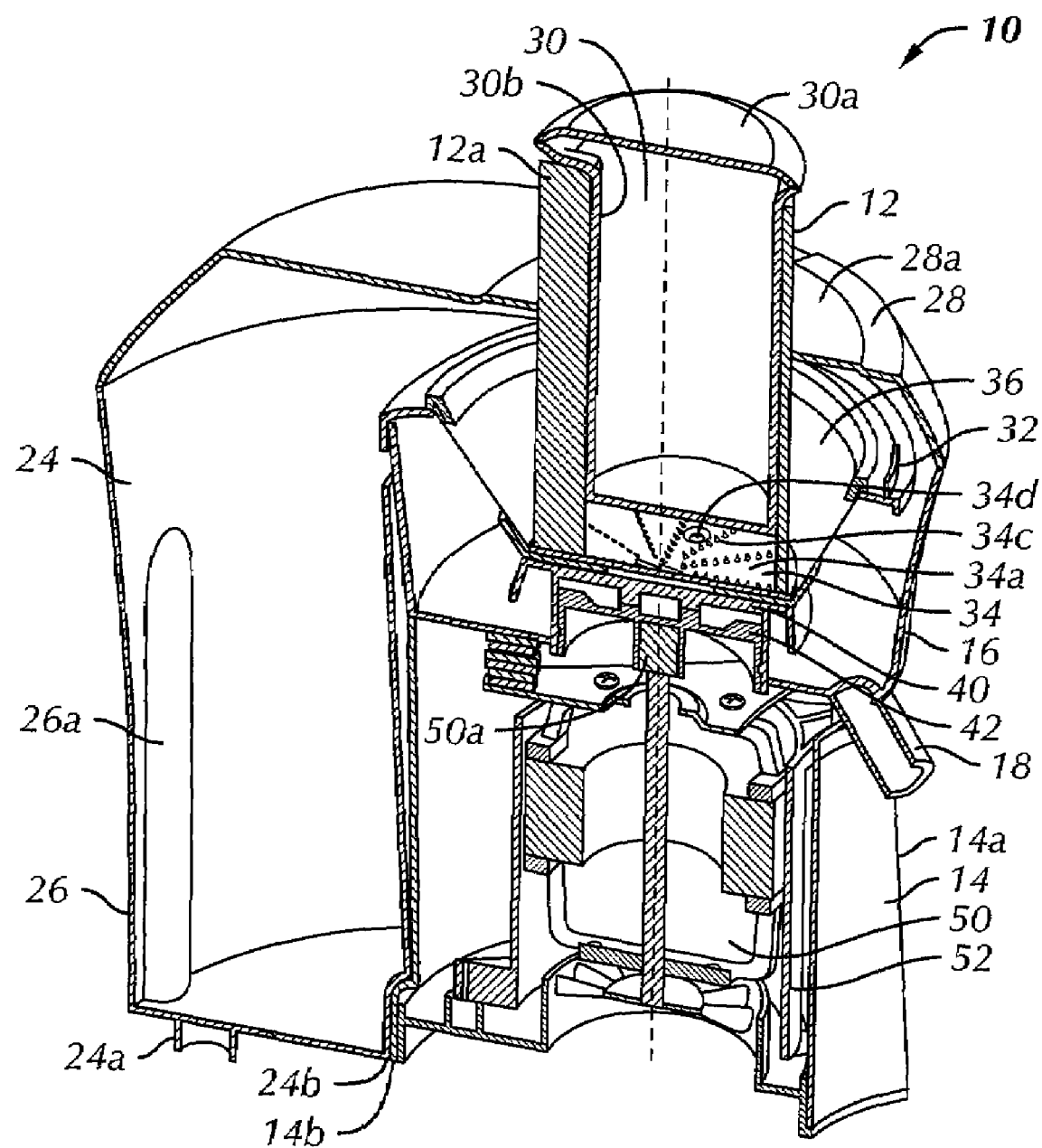
FIG. 2 is a cross sectional perspective view of the juice extractor shown in FIG. 1.
Figure 3:
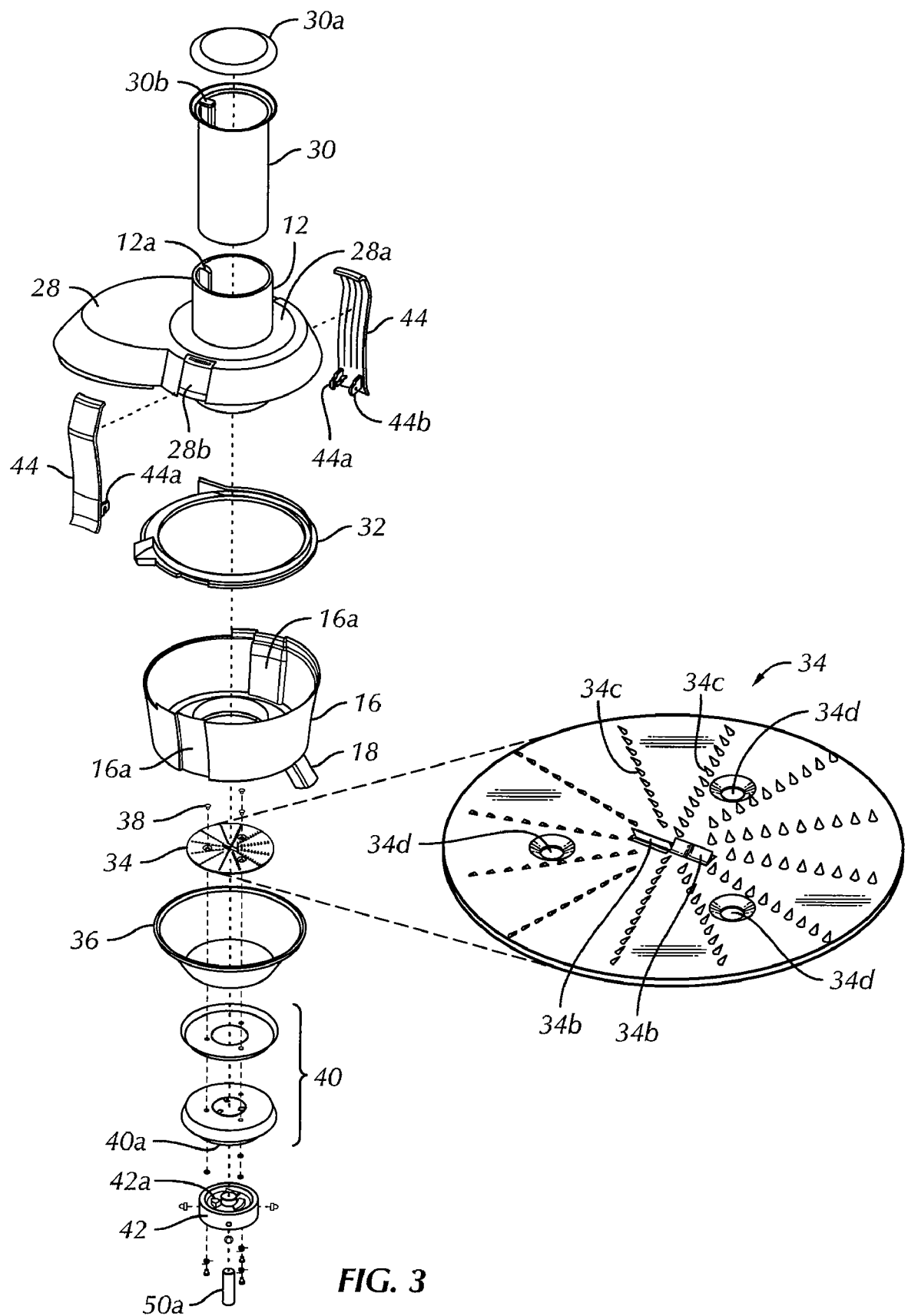
FIG. 3 is an exploded perspective view of the upper half of the juice extractor shown in FIG. 1.
Figure 4:
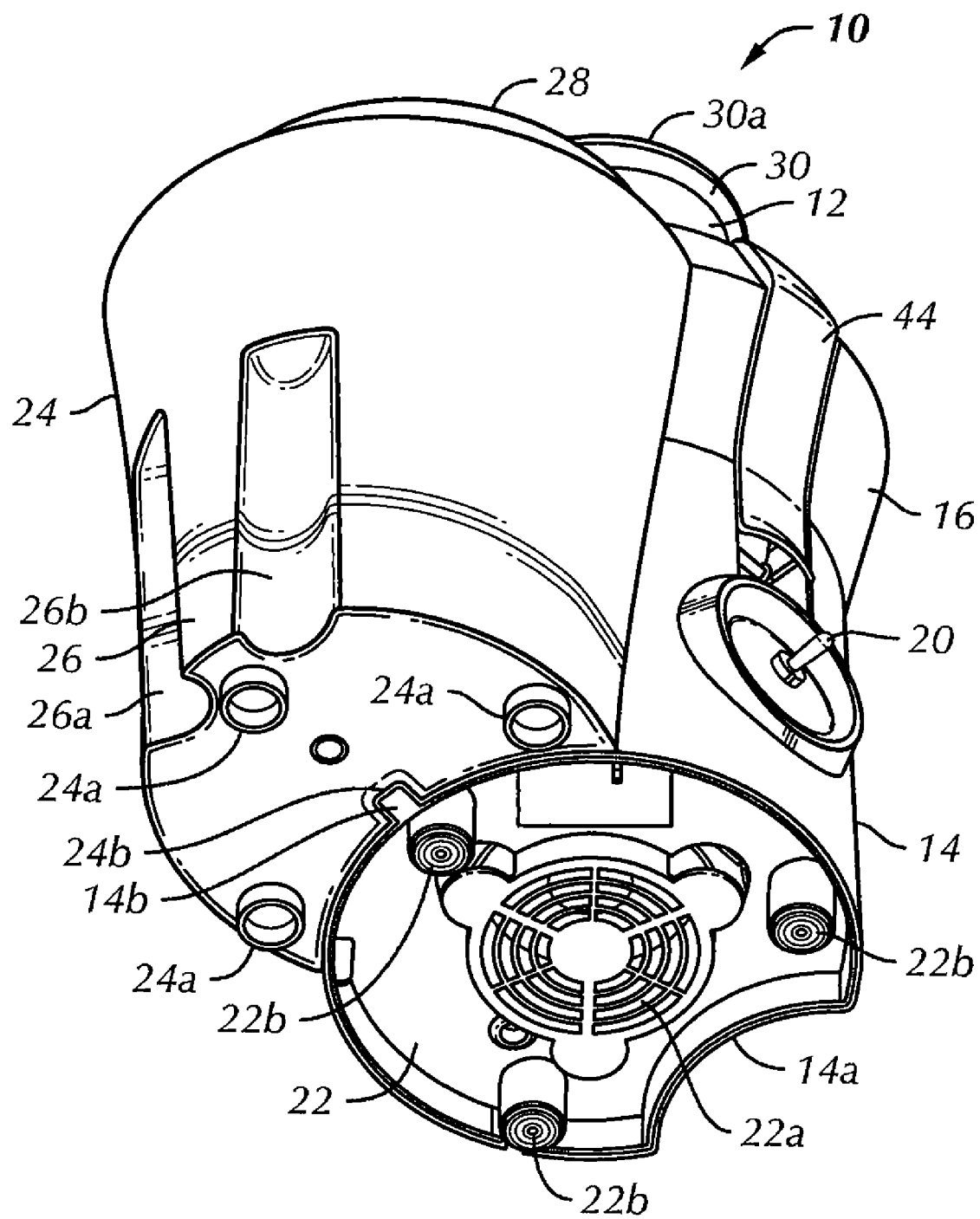
FIG. 4 is a bottom right side perspective view of the juice extractor shown in FIG. 1.

Referring to FIGS. 1-5, the juice extractor 10, shown fully assembled in FIGS. 1-2 and 4, includes a motor housing 14 with a preferably generally cylindrical juice box or upper housing 16 having an open top mounted to the top of the motor housing 14. The motor housing 14 is generally hollow and preferably contains electrical components of the juice extractor 10, which will be described in greater detail below. Preferably, the upper housing 16 has a generally hollow interior and includes a spout 18 extending generally downwardly therefrom through which juice (not shown) extracted from food stuffs within the juice extractor 10 can flow. The spout 18 is preferably oriented such that a glass (not shown) or other container (not shown) can be placed underneath the lower end of the spout 18 to enable the juice to be collected therein. While it was currently preferred that the spout 18 be integrally formed with the upper housing 16 it should be evident to one skilled in the art that the spout 18 can be formed separately from the upper housing 16 and engaged thereto in a conventional manner and/or pivotably engaged to the upper housing 16 to enable movement of the spout 18 when placing the glass thereunder, for instance.

As shown in FIG. 1, it is preferable that the motor housing 14 includes a generally arcuate cutout 14a in a side thereof corresponding generally to the location of the spout 18 to facilitate placement of the glass underneath the lower end of the spout 18. While it is preferred that the motor housing 14 have the arcuate cutout 14a therein, it is within the spirit and scope of the present invention that the motor housing 14 have a differently shaped cutout or no cutout at all, provided a glass or other container can be suitably placed underneath the lower end of the spout 18.

Preferably, a switch 20 is exposed on a front face of the motor housing 14 to allow a user to activate the juice extractor 10. Preferably, the switch 20 is pivotable between at least an OFF position and an ON position to activate an electric motor 50. While it is preferred that the juice extractor 10 have only one switch 10, it should be evident to one of ordinary skill in the art that the juice extractor 10 could have one or more switches, or a different switch such as a rotary knob to allow for multiple settings such as a high or low setting. Alternatively, the switch 10 or switches would allow for a plurality of settings to corresponding to a plurality of speeds of operation of the juice extractor 10 to be selected, without departing from the broad inventive concept thereof.

Referring now to FIG. 4, preferably disposed within a bottom of the motor housing 14 is a complimentary-shaped base 22. The base 22 preferably has a vent 22a for cooling the electric motor 50 and plurality of spaced apart feet 22b extending slightly downwardly thereof to facilitate support of the juice extractor 10 on top of a counter or other such support surface (not shown). It is preferred that the base 22 include three generally cylindrical, evenly-spaced feet 22b although it is within the spirit and scope of the present invention that the base 22 include more or less than three feet 22b and/or that the feet 22b be differently shaped, provided that the feet 22b are capable of functioning to support the juice extractor 10. Alternatively, it is contemplated that the base 22 include no feet 22b and the bottom surface of the base 22 function to support the juice extractor 10 on a surface. It is also within the spirit and scope of the invention that the feet 22b include suction cups (not shown) attached to the bottom ends thereof to enable at least mild engagement with the countertop, thereby at least inhibiting sliding motion or slippage of the juice extractor 10 on a countertop.

Referring now to FIGS. 1-5, when assembled, the juice extractor 10 preferably has an open-toped, generally hollow pulp container 24 removably attached thereto, preferably proximate the upper housing 16 and motor housing 14, for the collection of pulp and other food stuff byproducts of the juicing process, as will be described in greater detail below. Preferably, the pulp container 24 includes a plurality of spaced apart feet 24a extending slightly downwardly from the bottom surface thereof to support the pulp container 24 on the countertop or other surface. It is preferable that the pulp container 24 include three generally, evenly spaced feet 24a although it is within the spirit and scope of the present invention that the pulp container 24 include more or less than three feet 24a or that the feet 24a be shaped differently, provided that the feet 24a function to relatively stably support the pulp container 24 on a surface. Moreover, it is contemplated that the pulp container 24 include no feet and that a bottom surface of the pulp container 24 simply rest on the surface to support the pulp container 24 thereon. The pulp container 24 further preferably includes a graspable handle 26 in a side surface thereof. The graspable handle 26 includes a pair of grooves 26a, 26b extending in the axial direction and projecting radially inward spaced apart from one another on either side of the graspable handle 26. The pair of grooves 26a, 26b are preferably slightly spaced apart from and parallel to one another, but are sufficiently close to one another to allow the user to grip the handle 26 thereby in order to lift or otherwise move the pulp container 24. While this configuration is preferred, it is within the spirit and scope of the present invention that the pulp container have a handle of a different shape or configuration than the handle grooves 26a, 26b described herein, provided the handle 26 allows the user to pick up and move the pulp container 24. Further alternatively, it is contemplated that the pulp container 24 have no handle at all.

The pulp container 24 includes an alignment indentation 24b for mating with an alignment protrusion 14b projecting outwardly from the motor housing 14. The alignment protrusion 14b is diametrically opposed to the cutout 14a for slidingly retaining the pulp container 24 to the motor housing 14. It is preferred that the configuration of the alignment protrusion 14b and alignment indentation 24b allow the pulp container 24 to be removed from the juice extractor 10 without first having to remove any other component of the juice extractor 10. Specifically, it is preferred that the bottom of the pulp container 24 be able to be pivoted outwardly away from the motor housing 14 and in order to slide the pulp container 24 downwardly. In this way, the user can relatively quickly and easily remove the pulp container 24, for instance, to empty the pulp container 24 of pulp and/or other food stuff byproducts and then replace the pulp container 24 to continue usage of the juice extractor 10, without having to expend additional time to first disengage any other components. Although it is preferred that the pulp container 24 be removable in this manner, it is within the spirit and scope of the present invention that the alignment protrusion 14b and the alignment indentation 24b further function to couple the pulp container 24 with the motor housing 14. That is, when assembled, a lid 28 could constrain the pulp container 24 from moving upwardly with respect to the motor housing 14 and the alignment protrusion 14b of the motor housing 14 would constrain the pulp container 24 from downward motion relative the motor housing 14 to enable the juice extractor 10 to be picked up and/or moved as a single unit without the pulp container 24 separating from the rest of the juice extractor 10.

The upper cover or lid 28 is provided for selective placement on top of the upper container housing 16 and pulp container 24 to generally enclose an interior of the juice extractor 10. The lid 28 is preferably generally figure-eight-shaped when viewed from above and is preferably common to both the upper housing 16 and the pulp container 24. The lid 28 preferably includes a generally cylindrical food chute 12 extending through a top surface 28a of the lid 28 and generally centrally located with respect to the upper housing 16 when the lid 28 is engaged thereto. It is preferred that the food chute 12 be generally perpendicular to the top surface 28a of the lid 28 and that the food chute 12 extend upwardly from the top surface 28a and also downwardly from the top surface 28a so that the food chute 12 extends a certain amount into the upper housing 16 of the assembled juice extractor 10. The food chute 12 is preferably relatively large when compared to food chutes with other known juice extractors (not shown). The food chute 12 has a diameter substantially equal to the diameter of a grating disk 34, as described in further detail below, and the axial center of the food chute 12 is generally in registry with the axial center of the grating disk 34. Specifically, it is preferred that the food chute 12 be approximately three inches in diameter, thereby enabling multiple food stuffs and/or larger food stuffs to pass there through at one time. While it is preferred that the food chute 12 be generally cylindrical and perpendicular with respect to the top surface 28a of the lid 28, it is within the spirit and scope of the present invention that the food chute 12 be shaped differently or be disposed at a different orientation with respect to the top surface 28a, provided the food chute 12 is capable of functioning in the manner described herein.

Figure 5:
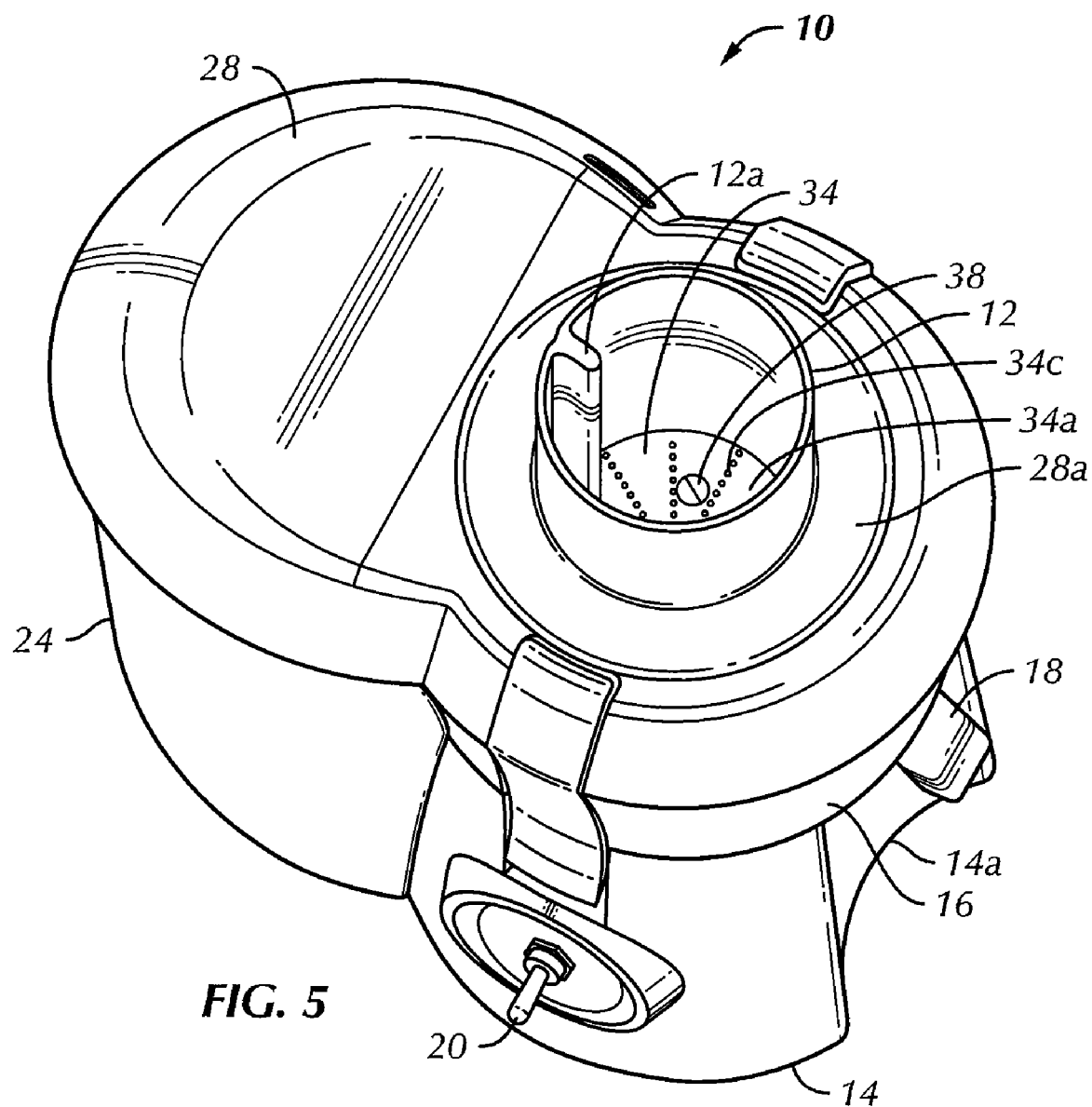
FIG. 5 is an upper left side perspective view of the juice extractor shown in FIG. 1, having the pusher removed from within a food chute.
Figure 6:
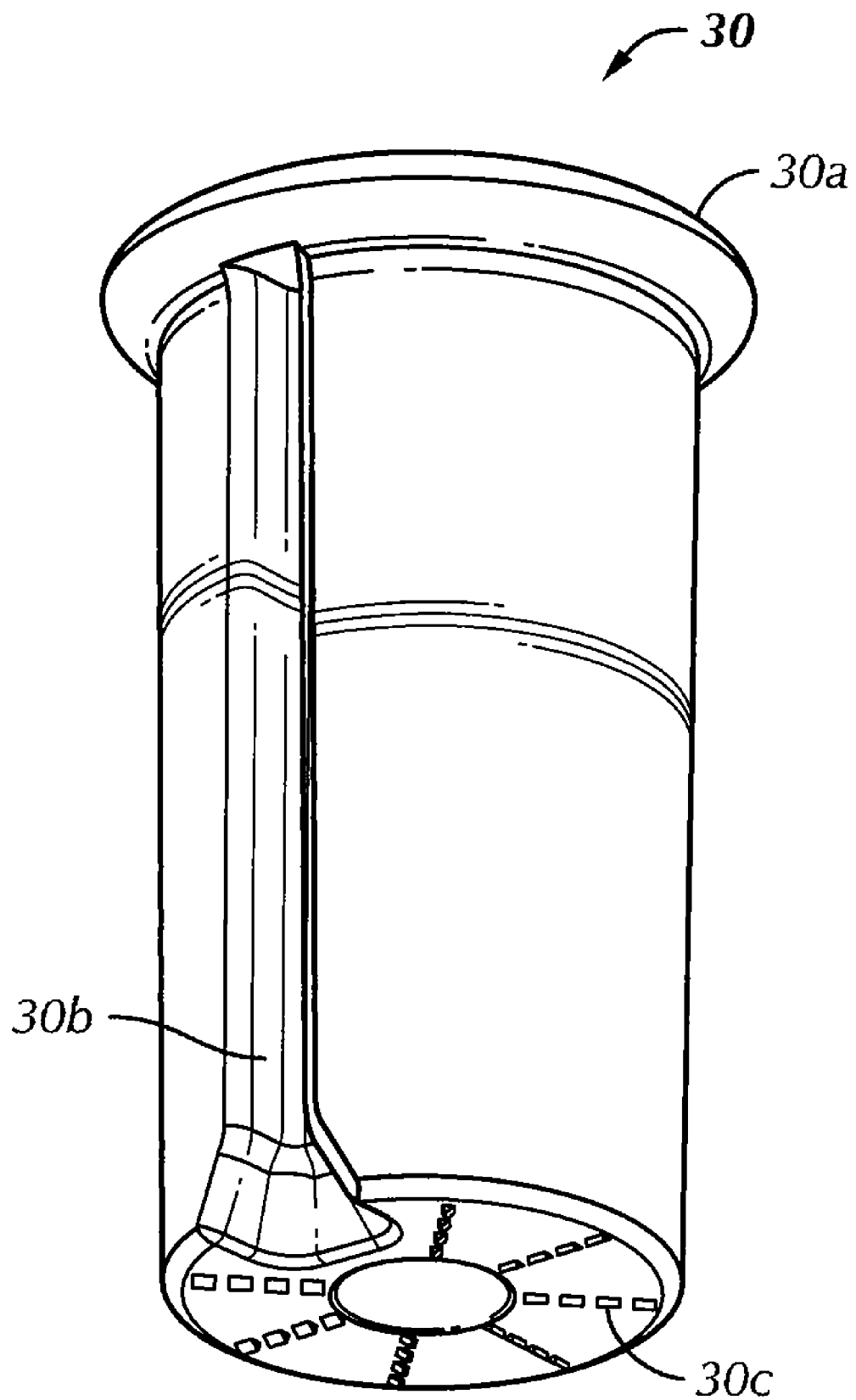
FIG. 6 is an enlarged bottom perspective view of a pusher of the juice extractor of FIG. 1.

Referring specifically to FIG. 5, a rib 12a extends radially inwardly from an inside surface of the food chute 12. Preferably, the rib 12a extends the length of the food chute 12 and functions to inhibit rotation of food stuffs within the food chute 12 during operation of the juice extractor 10, as will be described in greater detail below. It is within the spirit and scope of the present invention that more than one rib (not shown) may be included in the food chute 12 or that the rib 12a extends only partially along the inner surface of the food chute 12.

Referring to FIGS. 1-3 and 6, a generally cylindrical food pusher 30 is preferably freely insertable into the food chute 12 for the selective urging of food stuffs down the food chute 12. The food pusher 30 is preferably easily removable from within the food chute 12 in order to allow the user to insert food stuffs into the food chute 12 during use of the juice extractor 10. Preferably, the food pusher 30 is generally shaped to fit within the food chute 12 with minimal clearance between the food pusher 30 and the inner wall of the food chute 12. The food pusher 30 preferably includes a slightly larger end 30a at a top thereof to prevent the food pusher 30 from slipping entirely into the food chute 12. The larger end 30a also acts as a handle for easier grasping of the food pusher 30. The food pusher 30 further includes a slot 30b extending in the axial direction and projecting radially inwardly for accommodating the rib 12a in the food chute 12. The slot 30b is in sliding engagement with the rib 12a when the food pusher 30 is inserted into the food chute 12. The distal end of the food pusher 30 opposite the larger end 30a preferably includes a plurality of small protrusions 30c extending slightly axially thereof in order to enhance the grip of the food pusher 30 with food stuffs. The small protrusions 30c grip on to the food stuff when the food pusher 30 urges the food stuff down the food chute 12. The small protrusions 30c help to prevent independent rotation of the food stuff with regard to the food pusher 30 and the rib 12a prevents the food pusher 30 from rotating within the food chute 12.

Referring to FIGS. 2 and 3, the upper housing 16 further includes a juice ring 32 engaged with an inner surface of the upper housing 16, preferably proximate the top of the upper housing 16. The juice ring 32 preferably functions to help direct pulp and other food stuff byproducts into the pulp container 24 and help inhibit pulp and food stuff byproducts from entering the interior of the upper housing 16 and potentially flowing through the spout 18 with the juice or clogging the spout 18. It is preferred that the juice ring 32 is non-removably engaged with the upper housing 16 to facilitate assembly of the juice extractor 10. While this orientation is preferred, it is within the spirit and scope of the present invention that the juice ring 32 be separable from the upper housing 16 to aid in cleaning of the juice ring 32 and the upper housing 16, for instance.

Referring now to FIGS. 2-3 and 5, the grating disk 34 is rotatable about a substantially vertical axis. A frustoconically shaped filter 36 is attached to the outer periphery of the grating disk 34. The filter 36 projects upwardly and outwardly from the grating disk 34. The food chute 12 is arranged above the grating disc 34 and the filter 36. As mentioned above, the food chute 12 is preferably centrally located along the axis of rotation of the grating disc 34 and the diameter of the grating disc 34 is at least as large as the inner diameter of the food chute 12.

The filter 36 and grating disk 34 are preferably sized to fit within the open center of the juice ring 32 with sufficient clearance so that the filter 36 does not come into contact with the juice ring 32. At the same time, the clearance between the filter 36 and the juice ring 32 is preferably small enough to at least inhibit pulp and other food stuff byproducts from falling therebetween and into the interior of the upper housing 16. The grating disk 34 and filter 36 preferably function to grind, tear, and otherwise cut food stuffs passed through the food chute 12 and separate the juice from the pulp and/or other food stuff byproducts ground from the food stuffs. The grating disk 34 and filter 36 are preferably permanently attached together using rivets 38. The rivets 38 are recessed into the grating disk 34 such that the top of the rivets 38 are flush with the top of the grating disk 34. While it is preferred that the rivets 38 be used to attach the grating disk 34 and the filter 36, it is within the spirit and scope of the present invention that other fasteners be used instead, such as, but not limited to, screws, bolts, or other suitable, generally conventional fasteners.

When assembled, the filter 36 is preferably sandwiched between the grating disk 34 and a filter holder 40 such that the grating disk 34 is exposed within the filter 36 at the bottom thereof. The grating disk 34 has an upper side 34a provided with a pair of cutters 34b and a plurality of toothed blades 34c. The cutters 34b are generally centrally located on the grating disk 34 and each includes a cutting edge that faces in the rotational direction. Each of the tooth blades 34c has a semi-circular seat section extending slopingly and upwardly to form a triangular tip facing in the rotation direction. The toothed blades 34c function to grind and tear food stuffs inserted within the juice extractor 10 when the grating disk 34 is rotated during normal operation of the juice extractor 10, thereby enabling juice to be extracted from the food stuffs, as described in more detail below. The grating disk 34 also includes one or more recessed bores 34d to receive the rivets 38. While the described and shown configuration of the grating disk 34 is preferred, it is within the spirit and scope of the present invention that the cutters 34b and toothed blades 34c be shaped differently or be configured differently on the grating disk 34.

Referring now to FIGS. 2 and 3, the filter holder 40 preferably includes a cylindrical ring 40a extending from a bottom thereof. The filter holder 40 is removable and engageable with a clutch hub 42 of the juice extractor 10. The clutch hub 42 is generally cylindrical in shape and is preferably sized to fit within a ring (not shown) in the filter holder 38. The clutch hub 42 is outwardly spring biased to engage the filter holder 40 with the clutch hub 42. In order to remove the filter 36 from the clutch hub 42, sufficient upward force must be exerted on the filter 36 to overcome the spring-bias. Such a configuration provides for relatively easy assembly/disassembly of the juice extractor 10, while, at the same time, restraining the filter 36 from lifting off of the clutch hub 42 during operation of the juice extractor 10, thereby reducing the likelihood of the grating disk 34 coming into contact with other parts of the juice extractor 10, namely the food pusher 30 and/or a bottom end of the food chute 12. Preferably, one or more teeth teeth 42a are disposed in a top surface of the clutch hub 42 for mating engagement with the teeth (not shown) of the filter holder 40. Engagement of the teeth 42a with the teeth of the filter holder 40 preferably generally rotationally fixes the clutch hub 42 with the filter holder 40 of the filter 36 to allow the clutch hub 42 to impart rotational motion on the filter 36 and grating disc 34.

Referring to FIG. 2, the clutch hub 42 is fixed to an end of an output shaft 50a of the motor 50, such that rotation of the output shaft 50a causes rotation of the clutch hub 42. Preferably, the motor 50 is a generally conventional electric motor, although it is within the spirit and scope of the present invention that another type of motor may be used within the juice extractor 10, provided the motor is capable of functioning as described herein. Preferably, the motor 50 is retained within a protective housing 52 and the protective housing 52 is engaged with the motor housing 14 and/or the base 22 in a generally conventional manner, in order to anchor the motor 50 within the motor housing 16. Preferably, the motor 50 is electrically connected to the switch 20, which acts to selectively power the motor 50 with activation of the switch 20, described above. It should be evident to one of ordinary skill in the art that, when the juice extractor 10 is assembled, powering of the motor 50 causes rotation of the output shaft 50a, which, in turn, causes rotation of the clutch hub 42 and the filter 36 and grating disc 34 engaged therewith.

Referring to FIGS. 1, 3 and 4-5, the juice extractor 10 preferably includes at least one elongate, generally finger-shaped pivot arm 44 pivotably attached to the motor housing 16 with a hinge 44a. The pivot arm 44 has an axis of rotation generally tangent to the outer periphery of the upper housing 16. The juice extractor 10 preferably includes two pivot arms 44 that are preferably diametrically opposed to one another. The distal ends of the pivot arms 44 are in removable engagement with the lid 28 so that the lid 28 is held onto the upper housing 16 when the pivot arm 44 is engaged with the lid 28. Specifically, the distal ends of the pivot arms 44 frictionally engage or otherwise clamp the top surface 28a of the lid 28 when the juice extractor 10 is fully assembled. When the pivot arms 44 are disengaged from the top surface 28a of the lid 28, the pivot arms 44 preferably rotate freely outwardly from the juice extractor 10, away from the lid 28 and upper housing 16, thereby enabling the lid 28 and upper housing 16 to be removed from the motor housing 14. Preferably, the shape of the pivot arms 44 and hinges 44a dictate that the pivot arms 44 rotate outwardly away from the lid 28 and upper housing 16 due to gravity.

When in the upward engaged position, the pivot arms 44, specifically tabs 44b thereof, engage and close microswitches (not shown) engaged with the protective housing 52 within the motor housing 14. Though only one microswitch is required under UL standards, it is preferred that the juice extractor 10 includes two microswitches, one for each pivot arm 44. The microswitches are preferably electrically connected to the motor 50 and, therefore, are required to be in the closed position in order for the motor 50 to operate. When the clips pivot arms 44 are in a downward, disengaged position, the tabs 44b of the pivot arms 44 do not engage with the microswitches, thereby leaving the microswitches in a default open position to effectively prohibit the powering of the motor 50. In this way, the pivot arms 44 provide a safety feature of the juice extractor 10 by inhibiting the powering of the motor 50 when the lid 28 and upper housing 16 are not properly seated upon the motor housing 14 and the pivot arms 44 are not in the upward engaged position.

Referring to FIGS. 1 and 3-5, the upper housing 16 and lid 28 preferably include a pair of slots 16a and 28b respectively, extending in the axial direction and projecting radially inwardly. Each slot 16a, 28b is sized and shaped to receive a portion of one of the pivot arms 44. The pivot arms 44 are shaped to conform to the outer contour of the juice extractor 10 and the pivot arms 44 are preferably flush with the outer surface of the motor housing 14 and the upper housing 16 when engaged with the lid 28.

In use, the juice extractor 10 is fully assembled by the user, as shown in FIG. 1. The juice extractor 10 is then plugged into a conventional wall outlet or otherwise connected to a power source and the food pusher 30 is removed from within the food chute 12. The switch 20 is then set to the ON position and food stuffs are placed within the food chute 12 so that the food stuffs come into contact with the grating disk 34 within the juice extractor 10. The grating disk 34, rotated by the motor 50, grinds away pieces of the food stuffs through interaction of the cutters 34b and toothed blades 34c of the grating disk 34 with the food stuffs. In doing so, pieces of the food stuffs and juice extracted therefrom are forced outwardly against the filter 36 by rotation of the filter 36. The juice passes through the filter 36 and into the upper housing 16 to flow out of the upper housing 16 through the spout 18 while the pieces of food stuffs are retained within the filter 36. Due to the shape of the filter 36 and the rotation thereof, the pieces of food stuff are forced upwardly with respect to the filter 36 and at least some of the pieces of food stuffs are forced out of the filter 36 and into the pulp container 24. The juice flowing through the spout 18 is preferably collected by a glass or other suitable container disposed thereunder.

Due to the size of the food chute 12, multiple smaller diameter food stuffs, such as carrots, for instance, can be passed therethrough at the same time. Also, larger food stuffs, such as apples, for instance, can be passed through the food chute 12 generally without having to chop up the apples or other larger food stuffs before passing them through the food chute 12. Because the filter 36 and grating disc 34 are rotating, food stuffs engaging the grating disk 34 tend to rotate therewith. The rib 12a extending inwardly from the inner wall of the food chute 12 tends to come into abutment with rotating food stuffs and restrain rotational motion thereof to enable the food stuffs to be passed downwardly through the food chute 12 without the food stuffs rotating in an unrestrained manner within the food chute 12. Once food stuffs pass below the top of the food chute 12, the food pusher 30 can be inserted within the food chute 12 and pushed downwardly to further urge the food stuffs down through the food chute 12. The plurality of protrusions 30c extending axially from the end of the food pusher 30 further help to inhibit rotation of the food stuff. Once one batch of food stuffs is passed through the juice extractor 10, the pusher 30 can be removed from the food chute 12 to enable the user to process additional food stuffs in the manner described above.

Once a sufficient amount of food stuffs has been passed through the juice extractor 10, the switch 20 is flipped to the OFF position and the juice extractor 10 can be disassembled for cleaning of the components thereof. Preferably, the upper housing 16, juice ring 32, grating disc 34, filter 36 and pulp container 24 can be cleaned either by hand or with a dishwasher. Due to the configuration of the upper housing 16, juice ring 32, grating disc 34, filter 36 and pulp container 24 preferably little to no juice, pulp, or other food stuff byproducts come into contact with the motor housing 14, thereby enabling cleaning of the motor housing 14 using just a damp cloth.

It will be appreciated by those skilled in the art that changes could be made to the embodiments described above without departing from the broad inventive concept thereof. It is understood, therefore, that this invention is not limited to the particular embodiment disclosed, but it is intended to cover modifications within the spirit and scope of the present invention as defined by the appended claims.

I claim:

1. A fruit and vegetable juice extractor comprising:
   a grating disc rotatable about a substantially vertical axis;
   a frustoconically shaped filter attached to an outer periphery of the grating disc, the filter projecting upwardly and outwardly from the grating disc;
   a food chute arranged above the grating disc and the filter and having a length and an inner surface, a rib extending substantially along the length of the food chute and projecting radially inwardly a generally constant radial length from the inner surface, the rib having at least one planar outer lateral sidewall extending from the inner surface to a radial end of the rib; and
   a food pusher insertable into the food chute.

2. The fruit and vegetable juice extractor of claim 1, wherein the food chute has a diameter substantially equal to a diameter of the grating disc and an axial center of the food chute is generally in registry with an axial center of the grating disc.

3. The fruit and vegetable juice extractor of claim 1, wherein the food pusher includes a slot that extends in an axial direction and projects radially inwardly for accommodating the rib, the slot being in sliding engagement with the rib when the food pusher is inserted into the food chute.

4. The fruit and vegetable juice extractor of claim 1, wherein the food pusher includes a plurality of protrusions extending axially from an end thereof.

5. A fruit and vegetable juice extractor comprising:
   a motor housing;
   an upper housing mounted to the top of the motor housing, the upper housing having a generally hollow interior and an open top, the upper housing including a spout extending generally downwardly and fluidly communicating with the hollow interior;
   a pulp container proximate to the motor housing, the pulp container having an open top;
   a lid covering the open top of the pulp container and substantially covering the open top of the upper housing;
   a food chute extending through the lid for allowing access to the hollow interior of the upper housing; and
   at least one pivot arm pivotably attached to the motor housing, the pivot arm having an axis of rotation generally tangent to an outer periphery of the upper housing, the pivot arm having a releasing end and an engagement end, the engagement end of the pivot arm being in removable engagement with the lid in an engaged position, the pivot arm forming a generally rigid lever pivotable about the axis of rotation such that urging the releasing end of the pivot arm inwardly pivots the engagement end of the pivot arm outwardly to a released position, the lid being removable from the upper housing in the released position and held to the upper housing in the engaged position.

6. The fruit and vegetable juice extractor of claim 5, wherein the at least one pivot arm includes a pair of diametrically opposed pivot arms.

7. The fruit and vegetable juice extractor of claim 6, wherein the upper housing includes a pair of slots extending in an axial direction and projecting radially inwardly, each slot being sized and shaped to receive a portion of one of the pivot arms.

8. The fruit and vegetable juice extractor of claim 7, wherein the pivot arms are shaped to conform to an outer contour of the fruit and vegetable juice extractor and to be flush with an outer surface of the motor housing when engaged with the lid.

9. The fruit and vegetable juice extractor of claim 5, wherein the pulp container includes a graspable handle.

10. The fruit and vegetable juice extractor of claim 9, wherein the graspable handle comprises a pair of grooves extending vertically and projecting inwardly, the grooves being spaced apart laterally from one another.

11. The fruit and vegetable juice extractor of claim 5, further comprising
    a grating disc having a rotational direction rotatable about a substantially vertical axis within the upper housing, the grating disc having an upper side provided with a pair of cutters and a plurality of toothed blades, the cutters being generally centrally located on the grating disc and each including a cutting edge that faces in a rotational direction, each of the toothed blades having a semicircular seat section extending slopingly and upwardly to form a triangular tip facing in the rotational direction, the grating disc having one or more recessed bores; and
    a frustoconically shaped filter attached to the outer periphery of the grating disc with one or more fasteners secured within the recessed bores, the filter projecting upwardly and outwardly from the grating disc.

* * * * *